Figure 1:
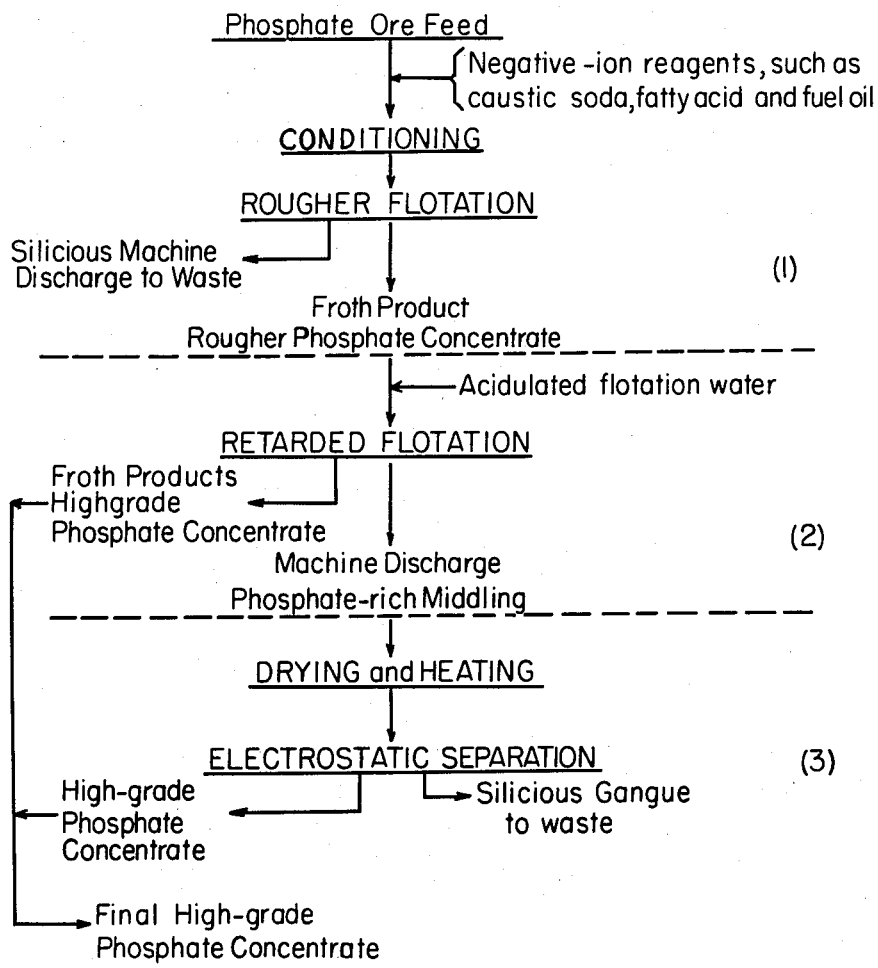

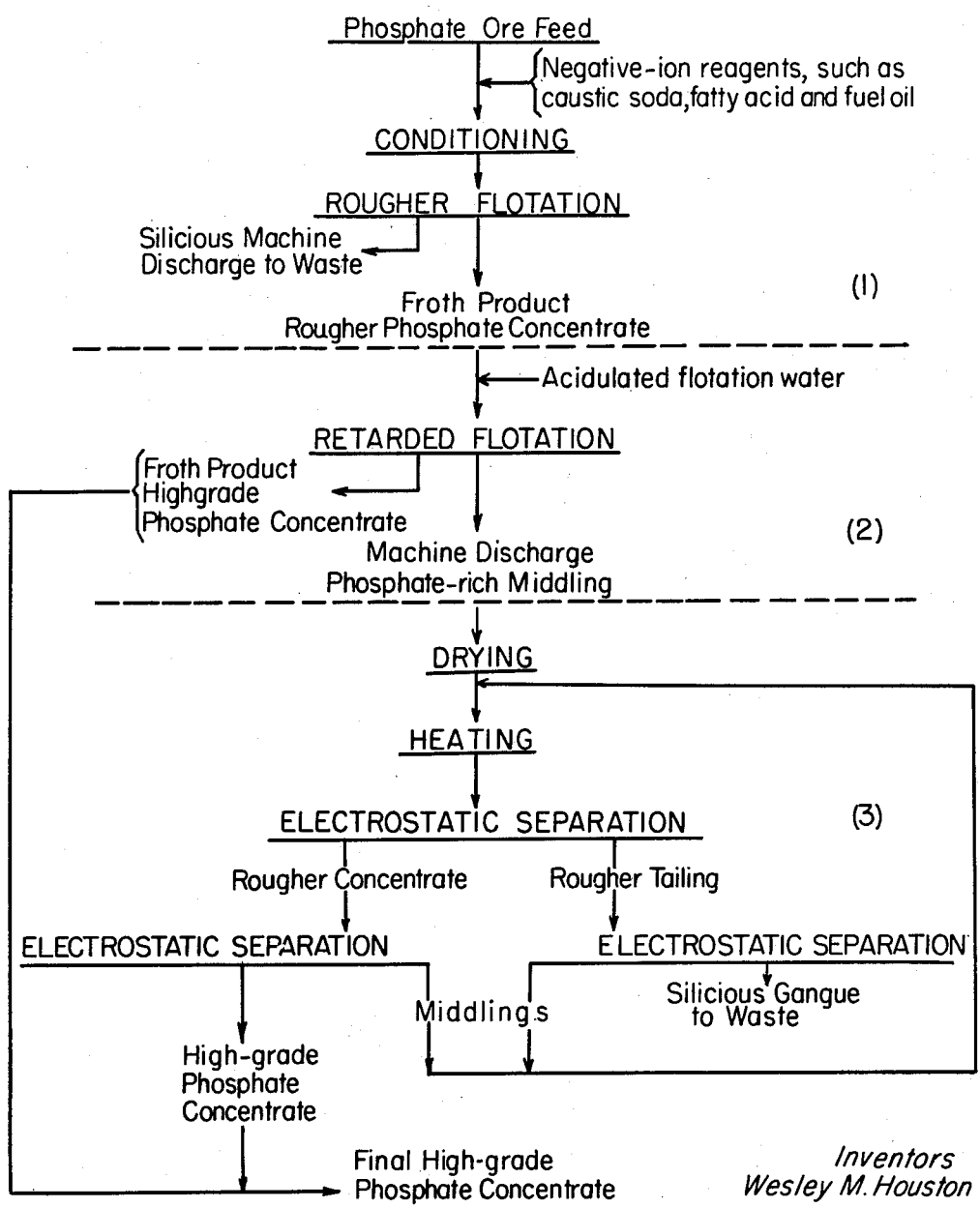

United States Patent Office 2,744,625
Patented May 8, 1956

2,744,625

CONCENTRATION OF PHOSPHATE ORES

Wesley M. Houston and Harvie W. Breathitt, Jr., Lakeland, Fla., assignors to Minerals & Chemicals Corporation of America, a corporation of Maryland Application November 27, 1953, Serial No. 394,781

2 Claims. (Cl. 209—12)

The present invention relates to the concentration of phosphate ores, and may be considered an improvement upon the method covered by a copending patent application, Serial No. 177,374, filed August 3, 1950, which is owned by the assignee of the present application now Patent No. 2,661,842.

The aforesaid application describes a method of concentrating phosphate minerals from their ores, which comprises (1) subjecting the ore in an aqueous pulp to a froth-flotation treatment with negative-ion reagents, thereby producing a froth-product which is a rougher concentrate of the phosphate values mixed with some silicious gangue, and a silicious machine-discharge which is sent to waste; (2) subjecting said rougher concentrate in an aqueous pulp to retarded froth-flotation treatment and removing as a part of the final product a froth-product having a low insoluble content, and a middling machine-discharge; (3) subjecting said middling in an aqueous pulp to treatment with a mineral acid followed by rinsing with water, thereby removing from said middling substantially all of the negative-ion reagents; and (4) subjecting said acid-treated and rinsed middling in an aqueous pulp to a froth-flotation treatment with positive-ion reagents, thereby producing a froth-product mostly composed of silicious gangue which is discarded, and a residue which is a high-grade phosphate concentrate which is combined with the previously mentioned high-grade phosphate concentrate; thereby producing a final high-grade phosphate concentrate containing a high proportion of the phosphate in the ore.

The present invention is the result of our conception and discovery that the method described in the above-mentioned application may be simplified and improved by omitting the aforesaid de-oiling step (3), and by substituting for the aforesaid step (4) which is the froth-flotation treatment with positive-ion reagents, a drying treatment followed by an electrostatic separation treatment which produce a high-grade phosphate concentrate which is combined with the high-grade phosphate produced by step (2), thereby producing a high-grade phosphate concentrate containing a high proportion of the phosphate in the ore.

The present method has the advantages that it not only eliminates the use of mineral acid for de-oiling, and eliminates flotation treatment with positive-ion reagents, but results in other economies which will be apparent to those skilled in the art, including the reduction of plant equipment required, while still obtaining from the ore a phosphate concentrate having a low insoluble content and containing most of the phosphate in the ore.

The invention will be understood from the following description, taken in connection with the accompanying drawings in which Fig. 1 is a simplified general flow-sheet of a typical plant practicing the invention; and Fig. 2 illustrates certain modifications in step (3) of the method. In these drawings the three steps of the method of the present invention are separated by dash lines, and are marked (1), (2) and (3). It will be understood that these flowsheets merely contribute to an understanding of the invention and that various additions to and modifications in the apparatus employed may be resorted to without departing from the spirit of the invention as defined in the claims hereto appended.

The steps of the improved method will now be described with the aid of the drawings.

The first step (1) in our improved method is the same as the first (1) step in the method described in the aforesaid copending application. That is, the phosphate ore feed is conditioned with suitable negative-ion reagents, such as caustic soda, fatty acid and fuel oil, and is then subjected to a rougher froth-flotation treatment which produces a froth-product which is a rougher phosphate concentrate, and a silicious machine-discharge which is sent to waste.

The second (2) step in our improved method is the same as the second (2) step in the method described in the aforesaid application. That is, the rougher phosphate concentrate from the first (1) step is subjected to retarded froth-flotation treatment by any one of the methods described in the aforesaid application. However, as illustrated in the drawings, we prefer to carry out the retarded froth-flotation treatment by employing acidulated flotation water having a low pH, with the result that the froth-flotation treatment results in a froth-product which is a high-grade phosphate concentrate, and a machine discharge which is a phosphate-rich middling.

In the third (3) step of our improved method, the said phosphate-rich middling, after being subjected to drying and heating treatments, is subjected to electrostatic separation treatment which results in a silicious gangue which is sent to waste and a high-grade phosphate concentrate which is mixed with the high-grade phosphate concentrate resulting from the second (2) step, thereby giving a final high-grade phosphate concentrate containing a high proportion of the phosphate in the ore feed. It will be understood, of course that electrostatic concentrates and tailings may be retreated electrostatically when necessary to improve the grade of concentrate and reduce the phosphate content of the tailings, the middlings being recirculated.

The following example shows how the improved method of the present invention may be successfully practiced in the manner illustrated in Fig. 2.

A phosphate ore feed which was −28 mesh, after being substantially deslimed, was conditioned in an aqueous pulp for about two minutes at 70% solids with 0.5 lb. of caustic soda, 3.0 lbs. of fuel oil, and 0.45 lb. of tall oil, all per ton of dry feed. The thus conditioned feed was diluted with tap water to about 20% solids in a Minerals Separation Laboratory air flow flotation machine, and was agitated and aerated, thereby producing a silicious machine-discharge which was discarded, and a froth-product which was a rougher phosphate concentrate containing some entrained silicious particles.

The rougher phosphate concentrate thus obtained was dewatered and repulped in the flotation machine with water containing sufficient sulfuric acid to give it a pH of about 2.9 (2.4 lbs. of $H_2SO_4$ per ton of original feed was used). The rougher phosphate concentrate was agitated for about five seconds in this acidulated water, and was then subjected to retarded froth-flotation treatment, which produced a froth-product containing a minimum sand content, that is a product which was a high-grade phosphate concentrate, and a machine-discharge which was a phosphate-rich middling.

This middling was dried overnight at 110° C. and was then separated on a laboratory electrostatic separator made by Carpco Engineering and Manufacturing. The temperature of the middling was maintained at over 100° C. during the following separation treatment. The electrostatic feed hopper was located so that the phosphate remained on the rotor for only about an inch of travel with the voltage off. The rotor was run slowly and at negative potential. The voltage reading was maintained at 90–100 with the electrostatic electrode as close as possible without arcing. The middling was passed through the electrostatic separator and split into a rougher concentrate and rougher tailing. The rougher concentrate was further divided on the machine into a cleaner (final) concentrate and a cleaner middling; the rougher tailing was divided into a final tailing and a tailing middling. Thus, four products were obtained; a final concentrate, a tailing, a cleaner middling and a tailing middling. The two middlings could have been combined and recirculated through the separator.

The metallurgical results of this test were as follows:

FLOTATION RESULTS

| Product | Wt., Percent | B. P. L., Percent | Insol., Percent | B. P. L. Recovery, Percent |
|---|---|---|---|---|
| Feed | 100.0 | 31.93 | | 100.0 |
| Concentrate | 25.2 | 75.5 | 3.1 | 59.6 |
| Middling | 29.3 | 39.7 | | 36.4 |
| Tailing | 45.5 | 2.8 | | 4.0 |

ELECTROSTATIC RESULTS

| Product | Wt., Percent | B. P. L., Percent | Insol., Percent | B. P. L. Recovery, Percent |
|---|---|---|---|---|
| Feed | 29.3 | 39.7 | | 36.4 |
| Concentrate | 4.2 | 73.7 | 4.8 | 9.7 |
| Middling from Retreating Rougher Concentrate | 1.9 | 64.1 | 16.8 | 3.8 |
| Middling from Retreating Rougher Tailing | 10.9 | 59.0 | | 20.1 |
| Final Tailing | 12.3 | 7.5 | | 2.9 |

OVERALL RESULTS, BASED ON RECIRCULATION OF ELECTROSTATIC MIDDLINGS

| Product | Wt., Percent | B. P. L., Percent | Insol., Percent | B. P. L. Recovery, Percent |
|---|---|---|---|---|
| Final Conc. | 39.5 | 74.9 | 3.7 | 92.4 |
| Total Tailing | 60.5 | 4.0 | | 7.6 |

Thus, from a phosphate ore containing 31.93% B. P. L. was obtained a phosphate concentrate containing 74.9% B. P. L. and only 3.7% insolubles, representing a recovery of 92.4% of the B. P. L. in said ore.

What is claimed is:

1. A method of concentrating phosphate minerals from their ores which includes the following steps: (1) subjecting the ore in an aqueous pulp to froth-flotation treatment with negative-ion reagents, thereby producing a froth-product which is a rougher concentrate of the phosphate values mixed with some silicious gangue; (2) subjecting the said rougher concentrate to froth flotation treatment in weakly acid flotation water and removing as a part of the final product a froth-product having a low insoluble content, and a machine discharge which is a phosphate-rich middling; (3) drying said middling and subjecting it to electrostatic separation treatment, thereby producing a high-grade phosphate concentrate which can be combined with the previously mentioned froth-product having a low insoluble content, and a silicious gangue which is discarded; thereby producing a final high-grade phosphate concentrate containing a high proportion of the phosphate in the ore.

2. The method of concentrating phosphate minerals from their ores according to claim 1, in which the phosphate product and the silicious gangue product of an initial separation in step 3 are each separately subjected to electrostatic retreatment to produce a high-grade concentrate which is combined with the high-grade froth-product produced in step 2, a silicious gangue which is discarded, and middling products which are recirculated for further electrostatic separation treatment thereof.

References Cited in the file of this patent

UNITED STATES PATENTS

| | | |
|---|---|---|
| 2,197,865 | Johnson | Apr. 23, 1940 |
| 2,661,842 | Duke et al. | Dec. 8, 1953 |